US006942349B2

United States Patent
Inamoto

(10) Patent No.: US 6,942,349 B2
(45) Date of Patent: Sep. 13, 2005

(54) ASYMMETRIC APERTURE DIAPHRAGM PLACING STRUCTURE FOR PROJECTION LENS AND PROJECTION TYPE IMAGE DISPLAY APPARATUS USING THE SAME

(75) Inventor: Masayuki Inamoto, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 129 days.

(21) Appl. No.: 10/677,247

(22) Filed: Oct. 3, 2003

(65) Prior Publication Data

US 2004/0080723 A1 Apr. 29, 2004

(30) Foreign Application Priority Data

Oct. 29, 2002  (JP) ........................................ 2002-314574

(51) Int. Cl.⁷ ..................... G03B 21/14; G03B 27/22; G02B 9/00
(52) U.S. Cl. ................... 353/97; 353/100; 359/739; 359/740; 355/71
(58) Field of Search .......................... 353/97, 31, 34, 353/122, 69, 100, 101, 88; 359/740, 651, 728, 730, 727, 221, 364, 633, 699, 726, 732, 857, 859, 894, 739; 355/67, 71, 53, 50; 250/396 R, 398, 311, 548; 356/401; 396/170, 235, 257, 449, 458, 460, 461, 485, 505, 507, 509

(56) References Cited

U.S. PATENT DOCUMENTS 6,724,546 B2 * 4/2004 Nishimae et al. ........... 359/740

FOREIGN PATENT DOCUMENTS

| JP | 63-144319 | 6/1988 |
| JP | 06-011681 | 1/1994 |
| JP | 3137435 | 12/2000 |

OTHER PUBLICATIONS

"DLP Projector System Optics Contrast–Enhancement Techniques", Texas Instruments Application Report, Jun. 2001.

* cited by examiner

Primary Examiner—Judy Nguyen
Assistant Examiner—Rochelle Blackman
(74) Attorney, Agent, or Firm—Snider & Associates; Ronald R. Snider

(57) ABSTRACT

An asymmetric aperture diaphragm placing structure for a projection lens is provided for securing an asymmetric aperture diaphragm to a lens holder. The asymmetric aperture diaphragm includes a positioning part formed asymmetrical about the optical axis. The lens holder has a mating part adapted to engage the positioning part only in a state where the asymmetric aperture diaphragm is in a predetermined direction with respect to the optical axis. The asymmetric aperture diaphragm is secured to the lens holder in a state where the positioning part and the mating part engage each other.

7 Claims, 2 Drawing Sheets

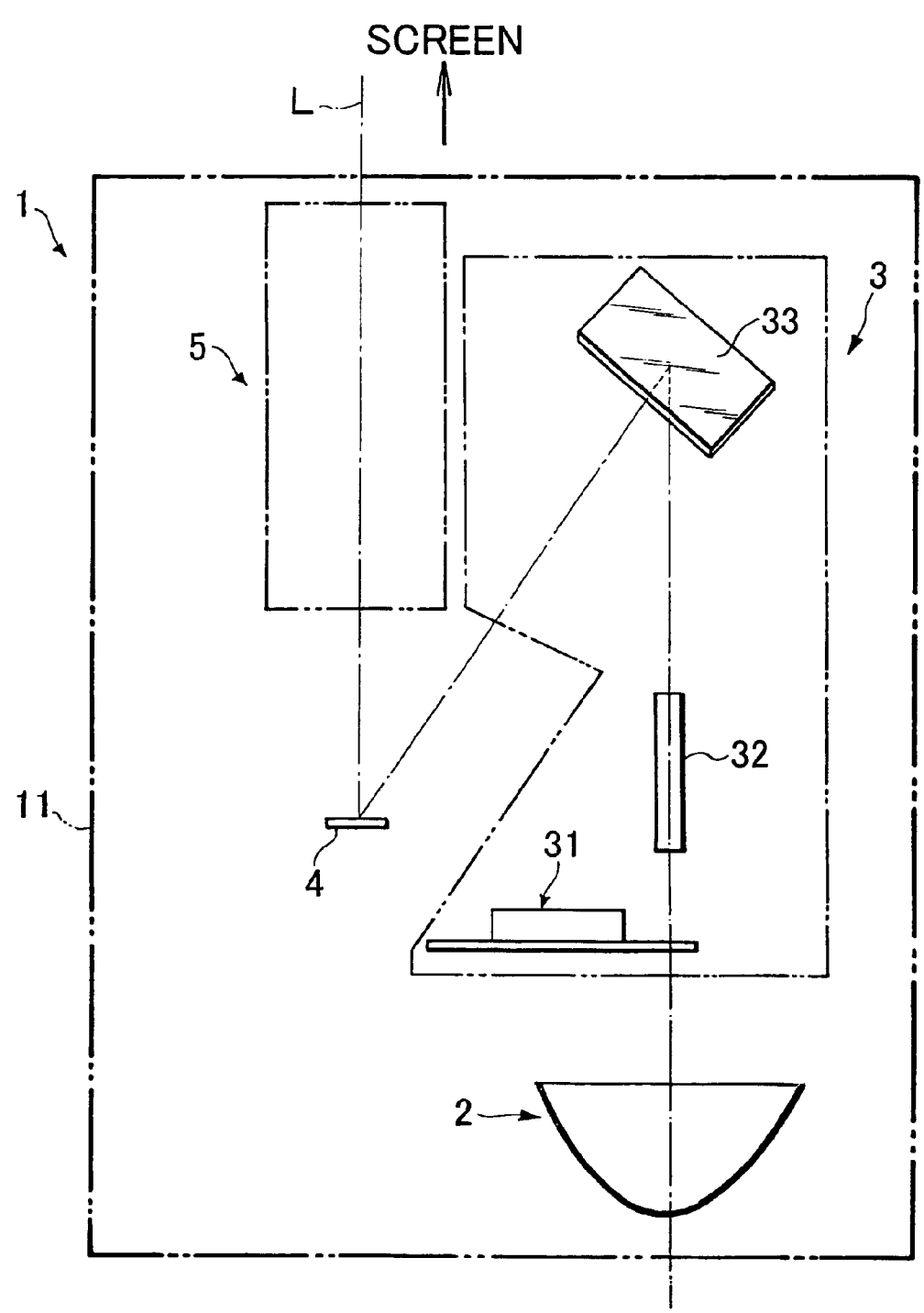

ASYMMETRIC APERTURE DIAPHRAGM PLACING STRUCTURE FOR PROJECTION LENS AND PROJECTION TYPE IMAGE DISPLAY APPARATUS USING THE SAME

RELATED APPLICATIONS

This application claims the priority of Japanese Patent Application No. 2002-314574 filed on Oct. 29, 2002, which is incorporated herein by reference.

BACKGROUND OF THE INVENTION

1. Field of the Invention

The present invention relates to an asymmetric aperture diaphragm placing structure for a projection lens, which secures an asymmetric aperture diaphragm having an aperture asymmetrical about the optical axis of the projection lens to a lens holder such as a lens chamber holding the projection lens in a projection type image display apparatus comprising image display means such as digital micromirror device (hereinafter referred to as "DMD"), for example; and a projection type image display apparatus comprising such an asymmetric aperture diaphragm placing structure.

2. Description of the Prior Art

A projection type image display apparatus has conventionally been known, in which a DMD comprising a number of mirror elements with variable light reflection angles adapted to change reflection angles of illumination light according to image signals so as to reflect only the signal light required for forming an image toward a projection lens system is used as image display means (light valve). The DMD comprises rectangular minute mirrors (mirror elements) having a high reflectance adapted to change their inclinations within a predetermined angle range according to image signals, which are formed on a silicon memory chip by using the CMOS semiconductor technology. The projection type image display apparatus using the DMD is configured so as to regulate the reflecting direction of light from the light source by changing the angles of mirror elements, such that only desirable reflected light is converged onto a screen, so as to project an image.

Thus, the DMD has such a characteristic that, of the light obliquely incident on its mirror element surface, light to become signal light is emitted toward the projection lens whereas light (unnecessary light) not to become signal light is emitted into a direction not oriented to the projection lens. However, a part of the light to become unnecessary light may be scattered by the mirror element surface, and thus formed scattering light may enter the projection lens and lower the contrast. Therefore, in order to eliminate influences of scattering light and improve the contrast, projection type image display apparatus using the DMD are usually provided with a diaphragm member by which the passing area of a luminous flux which can be made incident on the projection lens is restricted to a predetermined range. Since the DMD essentially has characteristics of oblique incidence and oblique emission, the aperture of the diaphragm member (diaphragm aperture) has been known to have a form asymmetrical about the optical axis of the projection lens, i.e., such a form that the diaphragm aperture cannot completely coincide with the original form after the diaphragm member is rotated about the optical axis by an angle of $2\pi/N$ (N=2, 3, 4, ...) or reversed (see TEXAS INSTRUMENTS INCORPORATED, Application Report LDPA006A-JUNE2001 "DLP Projector System Optics Contrast-Enhancement Techniques").

An asymmetric aperture diaphragm whose diaphragm aperture does not have a circular form though not completely asymmetrical about the optical axis may be used outside of the projection type image display apparatus using the DMD (see Japanese Unexamined Patent Publication No. SHO 63-144319, Japanese Unexamined Patent Publication No. HEI 06-011681, and Japanese Patent Publication No. 3137435). However, structures for attaching such an asymmetric aperture diaphragm to a lens chamber or the like, i.e., asymmetric aperture diaphragm placing structures, have not been disclosed yet.

As mentioned above, an asymmetric aperture diaphragm may be placed in a lens chamber for a projection lens in a projection type image display apparatus using a DMD. When the diaphragm aperture of the asymmetric aperture diaphragm has a form asymmetrical about the optical axis, however, the orientation of the asymmetric aperture diaphragm at the time of placement is limited to a predetermined direction. If the asymmetric aperture diaphragm is placed in other directions, the diaphragm member may lose its aimed optical performances.

It has conventionally been known to provide the lens chamber and asymmetric aperture diaphragm in the projection lens with marks indicating the direction in which the asymmetric aperture diaphragm is placed, so as to take notice that the placing direction should not be mistaken when placing the asymmetric aperture diaphragm. However, this has not been sufficient as means for always placing the asymmetric aperture diaphragm into a correct direction.

SUMMARY OF THE INVENTION

In view of the foregoing circumstances, it is an object of the present invention to provide an asymmetric aperture diaphragm placing structure for a projection lens, which can accurately position and secure an asymmetric aperture diaphragm having a diaphragm aperture asymmetrical about an optical axis to a lens chamber or the like for holding the projection lens, so as to attain a predetermined direction with respect to the optical axis; and a projection type image display apparatus comprising such an asymmetric aperture diaphragm placing structure for a projection lens.

For achieving the above-mentioned object, the present invention provides an asymmetric aperture diaphragm placing structure for a projection lens, the structure positioning and securing an asymmetric aperture diaphragm having a diaphragm aperture asymmetrical about an optical axis of the projection lens to a lens holder for holding the projection lens into a predetermined direction with respect to the optical axis, the asymmetric aperture diaphragm including a positioning part formed asymmetrical about the optical axis, the lens holder having a mating part adapted to engage the positioning part only in a state where the asymmetric aperture diaphragm is in the predetermined direction with respect to the optical axis, the asymmetric aperture diaphragm being secured to the lens holder in a state where the positioning part and mating part engage each other.

The "diaphragm aperture asymmetrical about an optical axis of the projection lens" refers to a diaphragm aperture having such a form that the diaphragm aperture cannot completely coincide with the original form after the asymmetric aperture diaphragm is rotated about the optical axis by an angle of $2\pi/N$ (N=2, 3, 4, ...) or reversed. Namely, it does not mean that the form of the diaphragm aperture itself must be asymmetric. The form of the diaphragm aperture itself may be asymmetric or have such a symmetry as symmetry about a line or rotational symmetry.

When there is only one positioning part, the "positioning part formed asymmetrical about the optical axis" refers to a positioning part having such a form that the positioning part cannot completely coincide with the original form after the asymmetric aperture diaphragm is rotated about the optical axis by an angle of $2\pi/N$ (N=2, 3, 4, . . . ) or reversed. When a plurality of positioning parts are provided, the form of each positioning part itself is not always asymmetric. The plurality of positioning parts may be placed at positions asymmetrical about the optical axis, i.e., at such positions that the positioning parts cannot completely coincide with the original positions after the asymmetric aperture diaphragm is rotated about the optical axis by an angle of $2\pi/N$ (N=2, 3, 4, . . . ) or reversed.

In the asymmetric aperture diaphragm placing structure for a projection lens in accordance with the present invention, the positioning part may be constituted by a plurality of boss holes arranged asymmetrical to each other about the optical axis, whereas the mating part may be constituted by a plurality of bosses corresponding to the plurality of boss holes, respectively.

Here, after the plurality of bosses engage the plurality of boss holes, respectively, at least a part of the plurality of bosses may be thermally deformed such that the asymmetric aperture diaphragm is secured to the lens holder.

The plurality of boss holes may include a positioning boss hole having substantially the same diameter as with a corresponding one of the plurality of bosses; an elliptic direction-determining boss hole, disposed at a position substantially opposing the positioning boss hole across the optical axis, having substantially the same width as with a corresponding one of the other bosses; and a guide boss hole formed with a predetermined play with respect to a corresponding one of the remaining bosses.

The lens holder may be a lens chamber.

The present invention provides a projection type image display apparatus comprising a light source section, an illumination optical system for outputting light from the light source section as predetermined illumination light, image display means for converting the illumination light from the illumination optical system into image display light carrying image information and outputting thus obtained image display light, and a projection lens system for emitting the image display light from the image display means so as to project an image onto an image projection surface; the projection type image display apparatus further comprising the asymmetric aperture diaphragm placing structure for a projection lens in accordance with the present invention.

The image display means may be a digital micromirror device.

BRIEF DESCRIPTION OF THE DRAWINGS

FIG. 2 is a view schematically showing the configuration of the projection type image display apparatus in accordance with an embodiment of the present invention.

DESCRIPTION OF THE PREFERRED EMBODIMENTS

Figure 1A:
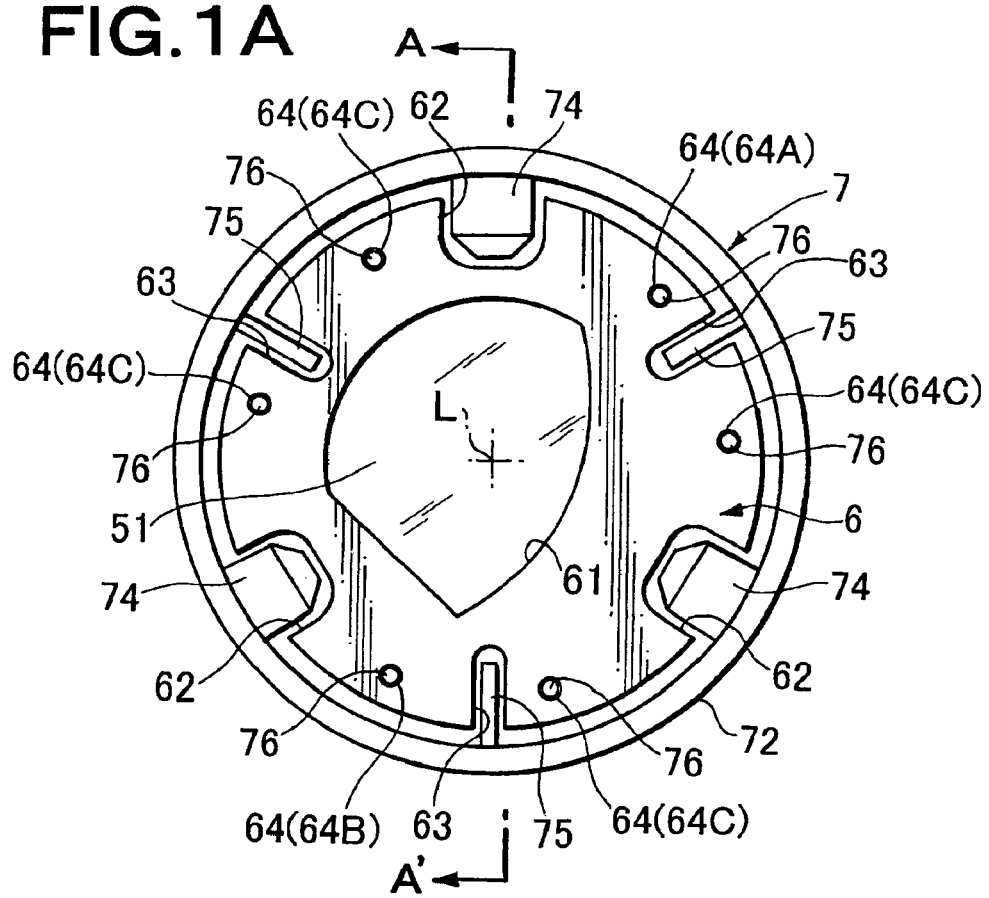
FIGS. 1A and 1B are views showing the asymmetric aperture diaphragm placing structure for a projection lens in accordance with an embodiment of the present invention.

In the following, embodiments of the present invention will be explained in detail with reference to the drawings.

FIG. 2 is a view schematically showing the configuration of the projection type image display apparatus in accordance with an embodiment of the present invention.

As shown in FIG. 2, the projection type image display apparatus 1 in accordance with this embodiment, which is used as a video projector, for example, comprises a light source section 2, an illumination optical system 3 disposed in front of the light source section 2 in the optical axis direction, an image display 4 disposed in front of the illumination optical system 3 in the optical axis direction, and a projection lens system 5 disposed in front of the image display 4 in the optical axis direction, which are contained within a housing 11.

The illumination optical system 3 comprises a color wheel 31 for decomposing a luminous flux (white luminous flux) from the light source section 2 into three colors of R, G, B in time series; a rod integrator 32 for homogenizing the density of color-decomposed luminous flux; and a reflecting mirror 33 for reflecting the luminous flux having thus homogenized density toward the image display 4. The illumination optical system 3 further comprises other optical elements such as a relay lens for relaying the luminous flux from the rod integrator 32 and a relay lens for emitting the luminous flux from the reflecting mirror 33 toward the image display 4, which are not illustrated.

For the image display 4, a DMD (digital micromirror device) is used, for example. The DMD comprises a mirror surface in which a very large number of mirror elements (aluminum mirrors each having a rectangular form) are arranged on a substrate, whereas reflecting directions of each of the mirror elements constituting the mirror surface can independently be switched between two directions (forming a narrow angle of about 20° or 24°). The switching of reflecting directions is carried out by ON/OFF control of an image signal (video signal) fed into the DMD while employing each mirror element as a pixel. Under this control, the image display converts the illumination light incident thereon from the illumination optical system 3 into image display light carrying image information and outputs the image display light toward the projection lens system 5.

The projection lens system 5 comprises a plurality of projection lenses arranged in series; and a lens moving mechanism adapted to move the plurality of projection lenses along the optical axis so as to change the focal length, thereby altering the image magnification and the like. Thus, the projection lens system 5 is configured such that the image display light incident thereon from the image display 4 can be projected onto an image projection surface (screen).

Figure 1B:
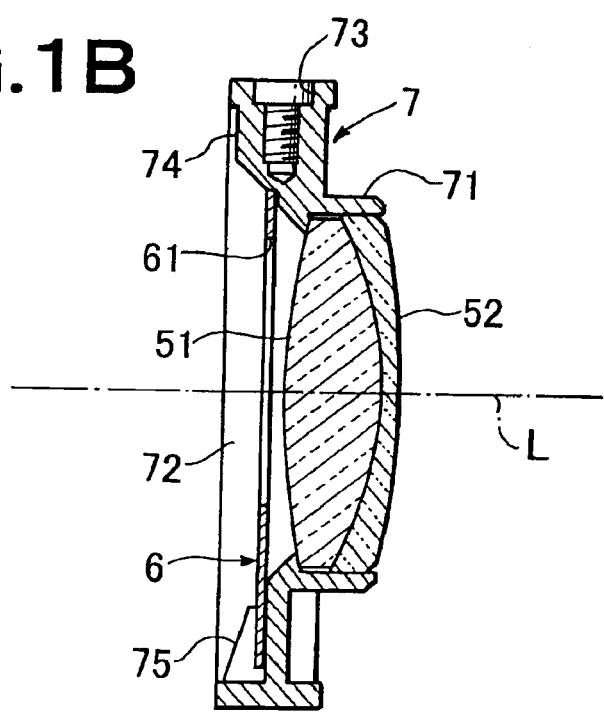

Though not depicted in FIG. 2, the asymmetric aperture diaphragm 6, shown in FIGS. 1A and 1B, for restricting the area through which the luminous flux from the image display 4 passes is placed within the projection lens system 5 in order to improve the contrast. FIGS. 1A and 1B are views showing the asymmetric aperture diaphragm placing structure for a projection lens in accordance with an embodiment of the present invention. Specifically, FIG. 1A is a front view of the structure, whereas FIG. 1B is a sectional view thereof taken along the line A–A' of FIG. 1A. For easier identification, FIG. 1B illustrates the asymmetric aperture diaphragm 6 thicker than in practice.

As shown in FIG. 1A, the asymmetric aperture diaphragm 6 has a diaphragm aperture 61 asymmetrical about the optical axis L. Namely, the diaphragm aperture 61 cannot completely coincide with the original form thereof after the asymmetric aperture diaphragm 6 is rotated about the optical axis L by an angle of $2\pi/N$ (N=2, 3, 4, . . . ) or reversed. As such, the asymmetric aperture diaphragm 6 is placed in a limited orientation with respect to the optical axis L. The asymmetric aperture diaphragm 6 exhibits its aimed optical performances only when placed in a predetermined direction with respect to the optical axis L. Otherwise, the asymmetric aperture diaphragm 6 not only fails to exhibit the aimed performances (thus lowering the contrast ratio and yielding stray light), but may cause such inconveniences as failures and damages generated upon temperature rises, since powerful image light originally intended to be projected may irradiate the non-aperture part of the asymmetric aperture diaphragm. Though such inconveniences can be eliminated if the error in assembling is found in the inspection before shipment, the process must be turned back to reassembling, which complicates the operation.

The asymmetric aperture diaphragm placing structure for a projection lens in accordance with the embodiment shown in FIGS. 1A and 1B is used for accurately placing the asymmetric aperture diaphragm 6, which will now be explained in detail with reference to FIGS. 1A and 1B.

The asymmetric aperture diaphragm 6 is attached to a lens chamber 7 acting as a projection lens holder. The lens chamber 7 includes a cylindrical lens holding part 71 for holding projection lenses 51, 52; and a cylindrical asymmetric aperture diaphragm holding part 72, formed with a diameter greater than that of the lens holding part 71, having a space for attaching the asymmetric aperture diaphragm 6. The asymmetric aperture diaphragm holding part 72 includes projections 74 formed in order to provide screw holes 73 for screws (not depicted) for attaching the lens chamber 7 to the body of the apparatus, and ribs 75 formed for reinforcement. As shown in FIG. 1A, three projections 74 and three ribs 75 are formed at equal angular intervals about the optical axis L.

The asymmetric aperture diaphragm holding part 72 is formed with six bosses 76 acting as mating parts projecting along the optical axis L. All the six bosses 76 are formed with the same diameter. The bosses 76 are placed at respective positions asymmetrical about the optical axis L, i.e., at such positions that all the bosses 76 cannot completely coincide with their original positions after the lens chamber 7 is rotated about the optical axis L by an angle of $2\pi/N$ (N=2, 3, 4, ... ) or reversed.

On the other hand, the asymmetric aperture diaphragm 6 including the asymmetric diaphragm aperture 61 as mentioned above has a substantially circular outer peripheral form as a whole as shown in FIG. 1A. The outer peripheral part is formed with three cutouts 62 for receiving the projections 74 and three cutouts 63 for receiving the ribs 75 at equal angular intervals about the optical axis L.

The asymmetric aperture diaphragm 6 also includes six boss holes 64 as positioning parts corresponding to the respective bosses 76 provided with the asymmetric aperture diaphragm holding part 72 of the lens chamber 7. The boss holes 64 are classified into three kinds. Namely, the six boss holes 64 include a positioning boss hole 64A, a direction-determining boss hole 64B, and guide boss holes 64C. The positioning boss hole 64A is formed with substantially the same diameter as that of the boss 76. The direction-determining boss hole 64B is disposed at a position substantially opposing the positioning boss hole 64A across the optical axis L and has an elliptic form with a width substantially the same as the diameter of the boss 76. Each of the remaining four guide boss holes 64C is formed with a diameter slightly larger than that of the boss 76 while yielding a predetermined play with respect to the boss 76. Though the boss holes 64 are classified into three kinds as such, they will simply be referred to as "boss holes 64" unless specifically distinguished from each other.

The six bosses 76 provided with the lens chamber 7 and the six boss holes 64 provided with the asymmetric aperture diaphragm 6 can engage each other only when the asymmetric aperture diaphragm 6 is oriented correctly with respect to the lens chamber 7, i.e., when the diaphragm aperture 61 is in a predetermined correct direction with respect to the optical axis L. The position of the asymmetric aperture diaphragm 6 with respect to the lens chamber 7 is accurately defined when the positioning boss hole 64A and position-determining boss hole 64B engage their corresponding bosses 76. The four guide boss holes 64C function as guides for allowing the six bosses 76 and the six boss holes 64 to engage each other only when they correspond to each other one by one. Each of the four guide boss holes 64C has a play with respect to its corresponding boss 76 so as to be able to absorb dimensional errors in manufacture.

After the asymmetric aperture diaphragm 6 engages the asymmetric aperture diaphragm holding part 72 of the lens chamber 7, at least a part of the six bosses 76 is thermally deformed, whereby the asymmetric aperture diaphragm 6 is secured to the lens chamber 7 (by thermal caulking).

In the asymmetric aperture diaphragm placing structure for a projection lens in accordance with this embodiment, as mentioned above, the six bosses 76 provided with the lens chamber 7 are disposed at respective positions asymmetrical with each other, whereby the asymmetric aperture diaphragm 6 having the six boss holes 64 corresponding to the respective bosses 76 can engage the lens chamber 7 only in the state where the diaphragm aperture 61 is in a predetermined correct direction with respect to the optical axis L.

This can reliably prevent the asymmetric aperture diaphragm 6 from being attached to the lens chamber 7 in directions different from the predetermined direction, thereby keeping the asymmetric aperture diaphragm 6 from losing its aimed optical performances. The projection type image display apparatus 1 comprises such an asymmetric aperture diaphragm placing structure for a projection lens, thereby securely achieving the aimed object of improving the contrast as expected by the placement of the asymmetric aperture diaphragm 6, which makes it possible to improve performances of the product and enhance the reliability thereof.

At least a part of the bosses 76 is thermally deformed so as to secure the asymmetric aperture diaphragm 6 to the lens chamber 7. Namely, the boss 76 functioning to position the asymmetric aperture diaphragm 6 with respect to the lens chamber 7 at the time of attachment is also used for securing the asymmetric aperture diaphragm 6 and the lens chamber 7 to each other. As a consequence, their assembling step can be made simpler and less expensive as compared with the case where the asymmetric aperture diaphragm 6 and the lens chamber 7 are secured to each other by using other means such as adhesives and screws.

Though an embodiment of the present invention is explained in the foregoing, the asymmetric aperture diaphragm placing structure for a projection lens and the projection type image display apparatus in accordance with the present invention can be modified in various manners without being restricted to the above-mentioned embodiment.

For example, while the asymmetric aperture diaphragm is provided with six boss holes as positioning parts whereas the lens chamber is provided with six bosses as mating parts, the numbers of boss holes and bosses can be changed as appropriate. Also, the classification of boss hole functions is not limited to the example mentioned above.

Though the lens chamber is provided with bosses whereas the asymmetric aperture diaphragm is provided with boss holes in the above-mentioned embodiment, the asymmetric aperture diaphragm may be provided with bosses whereas the lens chamber may be provided with boss holes, or a part of the bosses may be formed in the asymmetric aperture diaphragm whereas a boss hole corresponding to the boss may be formed in the lens chamber. Also, the bosses may be formed with diameters different from each other.

The modes of positioning part and mating part are not limited to boss and boss hole. For example, cutouts formed at respective positions asymmetrical with each other in the outer periphery of the asymmetric aperture diaphragm may be used as positioning parts, whereas projections formed in the lens chamber so as to correspond to the positioning parts may be used as mating parts.

Though the above-mentioned embodiment thermally deforms bosses so as to secure the asymmetric aperture diaphragm and the lens chamber to each other, i.e., the positioning part and mating part function to secure the asymmetric aperture diaphragm and the lens chamber to each other, the positioning function and the securing function may be separated from each other. For example, after the asymmetric aperture diaphragm and the lens chamber are combined with each other, they may be secured to each other by a screw or adhesive in the above-mentioned embodiment.

The asymmetric aperture diaphragm placing structure for a projection lens in accordance with the present invention is applicable not only to projection type image display apparatus using DMDs, but to various optical instruments and the like using asymmetric aperture diaphragms with asymmetric diaphragm apertures.

In the asymmetric aperture diaphragm placing structure for a projection lens in accordance with the present invention, as explained in detail in the foregoing, the asymmetric aperture diaphragm includes a positioning part formed asymmetrical about the optical axis, whereas the lens holder has a mating part adapted to engage the positioning part only in a state where the asymmetric aperture diaphragm is in a predetermined direction. The asymmetric aperture diaphragm is secured to the lens holder in a state where the positioning part and the mating part engage each other. As a consequence, the following effects can be achieved.

Namely, the asymmetric aperture diaphragm cannot be combined with or secured to the lens holder unless the diaphragm aperture is in a predetermined correct direction with respect to the optical axis. This can reliably prevent the asymmetric aperture diaphragm from being attached to the lens holder in directions different from a predetermined correct direction, thereby keeping the asymmetric aperture diaphragm from losing its aimed optical performances.

The projection type image display apparatus in accordance with the present invention comprises such an asymmetric aperture diaphragm placing structure for a projection lens, thereby being able to securely improve the contrast as expected by the placement of the asymmetric aperture diaphragm, which makes it possible to enhance the reliability of the product.

What is claimed is:

1. An asymmetric aperture diaphragm placing structure for a projection lens, the structure positioning and securing an asymmetric aperture diaphragm having a diaphragm aperture asymmetrical about an optical axis of the projection lens to a lens holder for holding the projection lens into a predetermined direction with respect to the optical axis,
   the asymmetric aperture diaphragm including a positioning part formed asymmetrical about the optical axis,
   the lens holder having a mating part adapted to engage the positioning part only in a state where the asymmetric aperture diaphragm is in the predetermined direction with respect to the optical axis,
   the asymmetric aperture diaphragm being secured to the lens holder in a state where the positioning part and mating part engage each other.

2. An asymmetric aperture diaphragm placing structure for a projection lens according to claim 1, wherein the positioning part is constituted by a plurality of boss holes arranged asymmetrical to each other about the optical axis; and wherein the mating part is constituted by a plurality of bosses corresponding to the plurality of boss holes, respectively.

3. An asymmetric aperture diaphragm placing structure for a projection lens according to claim 2, wherein, after the plurality of bosses engage with the plurality of boss holes, respectively, at least a part of the plurality of bosses is thermally deformed such that the asymmetric aperture diaphragm is secured to the lens holder.

4. An asymmetric aperture diaphragm placing structure for a projection lens according to claim 2, wherein the plurality of boss holes include a positioning boss hole having substantially the same diameter as with a corresponding one of the plurality of bosses; an elliptic direction-determining boss hole, disposed at a position substantially opposing the positioning boss hole across the optical axis, having substantially the same width as with a corresponding one of the other bosses; and a guide boss hole formed with a predetermined play with respect to a corresponding one of the remaining bosses.

5. An asymmetric aperture diaphragm placing structure for a projection lens according to claim 1, wherein the lens holder is a lens chamber.

6. A projection type image display apparatus comprising a light source section, an illumination optical system for outputting light from the light source section as predetermined illumination light, image display means for converting the illumination light from the illumination optical system into image display light carrying image information and outputting thus obtained image display light, and a projection lens system for emitting the image display light from the image display means so as to project an image onto an image projection surface;
   the projection type image display apparatus further comprising the asymmetric aperture diaphragm placing structure for a projection lens according to claim 1.

7. A projection type image display apparatus according to claim 6, wherein the image display means is a digital micromirror device.

* * * * *